(12) United States Patent
Wu

(10) Patent No.: US 7,898,958 B2
(45) Date of Patent: Mar. 1, 2011

(54) COMMUNICATION SYSTEM

(75) Inventor: Yi Wu, Beijing (CN)

(73) Assignee: Nokia Corporation, Espoo (FI)

(*) Notice: Subject to any disclaimer, the term of this patent is extended or adjusted under 35 U.S.C. 154(b) by 616 days.

(21) Appl. No.: 11/740,810

(22) Filed: Apr. 26, 2007

(65) Prior Publication Data

US 2007/0286077 A1 Dec. 13, 2007

(30) Foreign Application Priority Data

Jun. 7, 2006 (GB) ................................. 0611249.4

(51) Int. Cl.
*H04L 12/26* (2006.01)
(52) U.S. Cl. ........................................ 370/235; 370/443
(58) Field of Classification Search ................. 370/319, 370/338, 231, 282, 310, 229, 469, 437; 455/436, 455/450, 453; 709/236, 204
See application file for complete search history.

(56) References Cited

U.S. PATENT DOCUMENTS

| | | | | |
|---|---|---|---|---|
| 5,768,508 A * | 6/1998 | Eikeland | ................ | 709/202 |
| 6,038,216 A * | 3/2000 | Packer | ................ | 370/231 |
| 6,115,390 A * | 9/2000 | Chuah | ................ | 370/443 |
| 6,269,085 B1 * | 7/2001 | Provino et al. | ................ | 370/256 |
| 6,493,316 B1 * | 12/2002 | Chapman et al. | ................ | 370/231 |
| 6,505,253 B1 * | 1/2003 | Chiu et al. | ................ | 709/235 |
| 6,519,666 B1 * | 2/2003 | Azevedo et al. | ................ | 710/120 |
| 6,603,744 B2 * | 8/2003 | Mizutani et al. | ................ | 370/310 |
| 6,643,322 B1 * | 11/2003 | Varma et al. | ................ | 375/227 |
| 6,747,993 B2 * | 6/2004 | Rinchiuso | ................ | 370/468 |
| 6,918,005 B1 * | 7/2005 | Marchant et al. | ................ | 711/113 |
| 7,024,203 B1 * | 4/2006 | Naghian | ................ | 455/453 |
| 7,099,273 B2 * | 8/2006 | Ha et al. | ................ | 370/229 |
| 7,106,715 B1 * | 9/2006 | Kelton et al. | ................ | 370/338 |
| 7,317,754 B1 * | 1/2008 | Remy et al. | ................ | 375/222 |
| 7,349,406 B1 * | 3/2008 | Robins et al. | ................ | 370/395.41 |
| 7,359,325 B1 * | 4/2008 | Lewis et al. | ................ | 370/230.1 |
| 7,468,972 B2 * | 12/2008 | Walsh et al. | ................ | 370/348 |
| 7,483,402 B2 * | 1/2009 | Sturrock et al. | ................ | 370/282 |
| 2003/0123481 A1 | 7/2003 | Neale et al. | | |

(Continued)

FOREIGN PATENT DOCUMENTS

EP   0829986   3/1998

(Continued)

OTHER PUBLICATIONS

Darche et al., Using SCTP to improve performances of hybrid broadcast/telecommunication network system. IEEE Consumer Communications and Networking Conference, Jan. 8-10, 2006, p. 371-375, XP010893233.

(Continued)

*Primary Examiner*—Thong H Vu
(74) *Attorney, Agent, or Firm*—AlbertDhand LLP

(57) ABSTRACT

A method of transmitting data in a communication system. Data packets are transmitted from a first node to a second node on a first channel. An acknowledgement packet is transmitted from the second node to the first node on a second channel in response to receiving a number of packets on the first channel. The number of data packets that the acknowledgment packet is sent in response to is adjustable.

27 Claims, 3 Drawing Sheets

U.S. PATENT DOCUMENTS

| | | | | |
|---|---|---|---|---|
| 2004/0033806 A1* | 2/2004 | Daniel et al. | ............... | 455/450 |
| 2004/0082337 A1* | 4/2004 | Lacroix et al. | ............. | 455/450 |
| 2004/0136331 A1* | 7/2004 | Varma | ...................... | 370/278 |
| 2004/0236829 A1* | 11/2004 | Xu et al. | ................... | 709/204 |
| 2005/0135291 A1* | 6/2005 | Ketchum et al. | ........... | 370/319 |
| 2005/0135403 A1* | 6/2005 | Ketchum et al. | ........... | 370/437 |
| 2005/0135416 A1* | 6/2005 | Ketchum et al. | ........... | 370/469 |
| 2005/0157753 A1* | 7/2005 | Mayer | ...................... | 370/468 |
| 2005/0165949 A1* | 7/2005 | Teague | .................... | 709/236 |
| 2005/0237932 A1* | 10/2005 | Liu | ........................... | 370/230 |
| 2005/0250497 A1* | 11/2005 | Ghosh et al. | ............... | 455/436 |
| 2005/0286440 A1* | 12/2005 | Strutt et al. | ................ | 370/253 |
| 2006/0236190 A1* | 10/2006 | Vinh et al. | ................. | 714/749 |
| 2007/0168822 A1* | 7/2007 | Vitebsky et al. | ............ | 714/748 |

FOREIGN PATENT DOCUMENTS

| | | |
|---|---|---|
| EP | 1729436 | 12/2006 |
| WO | WO 01/37473 | 5/2001 |

OTHER PUBLICATIONS

International Search Report for PCT Application No. PCT/IB2007/001523.

* cited by examiner

Illustration of the adaptive ACK generation algorithm

COMMUNICATION SYSTEM

CROSS-REFERENCE TO RELATED PATENT APPLICATIONS

The present application claims priority to Great Britain Application No. 0611249.4, filed Jun. 7, 2006, the specification, drawings, claims and abstract of which is incorporated herein by reference in its entirety.

FIELD OF THE INVENTION

This invention relates to the communication of data, and particularly to a method for communicating data over asymmetric channels.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A variety of protocols are available for the communication of a data message over a communications link. In numerous protocols the message is divided into packets at the transmitter end; the packets are conveyed individually over the communications link; and at the receiver end the packets are combined to re-form the message. Each packet normally comprises a payload, which represents the portion of the message that the packet carries, and control data, which is carried in the packet One example of a packet protocol is TCP (transmission control protocol). This protocol is widely used as the transport layer protocol in internet communications. The performance of TCP is however significantly reduced in asymmetric data communication systems, wherein a forward channel carries information at much higher speed than a reverse channel.

One such asymmetric system is the DVB-H (Digital Video Broadcasting via Handheld Terminals) system. DVB-H is used to provide high quality video broadcasting services to hand held terminals. It has also been proposed to use DVB-H for downloading game data to hand held devices. DVB-H uses a downlink channel which can transport data from a server to a device at speeds high as 5-30 Mbit/s. When using TCP it is necessary to send acknowledgement packets (ACK) from the device to the server for every data packet received on the downlink channel. The server will only continue to send data upon receipt of ACK packets. The ACK packets are transmitted in the uplink direction on a low bandwidth in a cellular network such as the GPRS network with an average data rate of 10 Kbit/s.

The DVB-H downlink bandwidth is approximately 500~3000 times greater than the uplink channel which results in a large bandwidth asymmetry. Typically the maximum length of a general TCP data packet sent on the downlink channel is about 1500 bytes, and the length of an ACK packet sent on the uplink channel is 40 bytes. Since the ratio of the packet length between TCP data packet and ACK packet (1500/40=37.5) is much less than the ratio of throughput between downlink channel and uplink channel (500~3000), this means that the high speed data downloading will cause a large number of ACK packets to be buffered in the hand held device because the data rate of the uplink channel can not satisfy the generating rate of the ACK packets.

As a result of the large bandwidth asymmetry, the blocked ACK packets increase the round trip time (RTT) of the TCP connection and degrade the transmission throughput. Furthermore, the buffered ACK packets will also occupy a lot of resources of the hand held device which will impact on the device performance and other communication processes.

The document "Shekhar et al., Performance Optimisation of TCP/IP over Asymmetric Wired and Wireless links" describes a buffer management solution called SAD (Smart Ack Dropper) for performance optimization of TCP in asymmetric networks. The basic idea of the SAD solution is to monitor the Ack queue status and maintain an Ack sequence number table at the communication node in order to suppress the number of Ack packets belonging to the same flow.

It is an aim of embodiments of the present invention to overcome at least the problems identified above.

SUMMARY OF THE INVENTION

According to a first aspect of the invention there is provided a method of transmitting data in a communication system comprising transmitting data packets from a first node to a second node on a first channel and transmitting an acknowledgement packet from the second node to the first node on a second channel in response to receiving a number of packets on the first channel, wherein the number of data packets that the acknowledgment packet is sent in response to is adjustable.

According to a second aspect of the present invention there is provided a communication system for transmitting data between a first node and a second node comprising means for transmitting data packets from a first node to a second node on a first channel and means for transmitting an acknowledgement packet from the second node to the first node on a second channel in response to receiving a number of packets on the first channel, wherein the number of data packets that the acknowledgment packet is sent in response to is adjustable.

According to a third aspect of the present invention there is provided a device for transmitting data in a communication system comprising means for receiving data packets from a network node on a first channel and means for transmitting an acknowledgement packet from to the first network node on a second channel in response to receiving a number of packets on the first channel, wherein the number of data packets that the acknowledgment packet is sent in response to is adjustable.

According to a fourth aspect of the present invention there is provided a device for transmitting data in a communication system comprising a receiver arranged to receive data packets from a network node on a first channel and a transmitter arranged to transmit an acknowledgement packet from to the first network node on a second channel in response to receiving a number of packets on the first channel, wherein the number of data packets that the acknowledgment packet is sent in response to is adjustable.

These and other advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

In the following the present invention will be described with reference to the accompanying drawings in which.

DETAILED DESCRIPTION OF THE PREFERRED EMBODIMENTS

Embodiments of the invention are described in relation to a broadcast network and a cellular network. However, the present invention is not restricted thereto, but any other bandwidth asynchronous systems such as some extremely asynchronous ad-hoc networks that can also be enhanced by applying the present invention.

Figure 1:
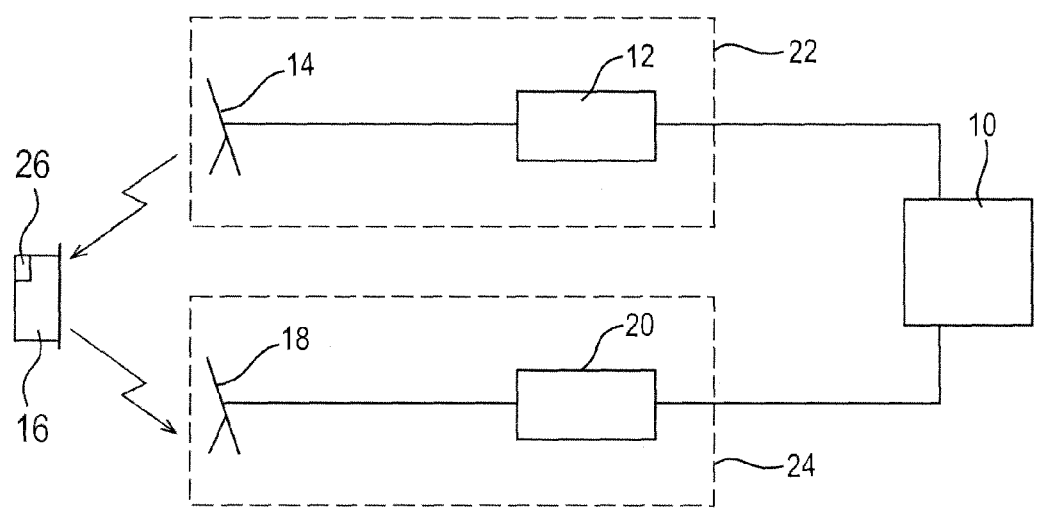
FIG. 1 is a schematic representation of a DVB-H system.

Reference is first made to FIG. 1 which shows a schematic representation of a DVB-H system. Data such as digital video broadcasting data is downloaded from a data server 10 to a DVB-H supported hand held device 16 via a multiplexer 12 and DVB-H transmitter 14 belonging to a broadcast network 22. The data is sent using TCP as data packets on a downlink wireless channel to hand held device 16.

The hand held device is arranged to send ACK packets acknowledging the received TCP packets to the server 10. ACK packets are sent on an uplink channel of the cellular network 24 via a base station 18 and the UMTS network 20. The hand held device 16 includes a TCP sink in a TCP module 26. The function of the TCP sink will be described hereinafter.

The device 16 is arranged to generate one ACK for receiving every K data packets. K is defined as the ACK generation rate. The ACK is sent as a cumulative acknowledgement relating to the receipt of the K data packets. In accordance with an embodiment of the invention the TCP sink is arranged to dynamically adjust the ACK packet generation rate K in accordance with the measured throughput ratio of the downlink DVB-H and the uplink cellular channel. The TCP sink is therefore arranged to monitor the TCP data packets arriving on the downlink DVB-H channel and the ACK packets sent on the uplink cellular channel.

Figure 2:
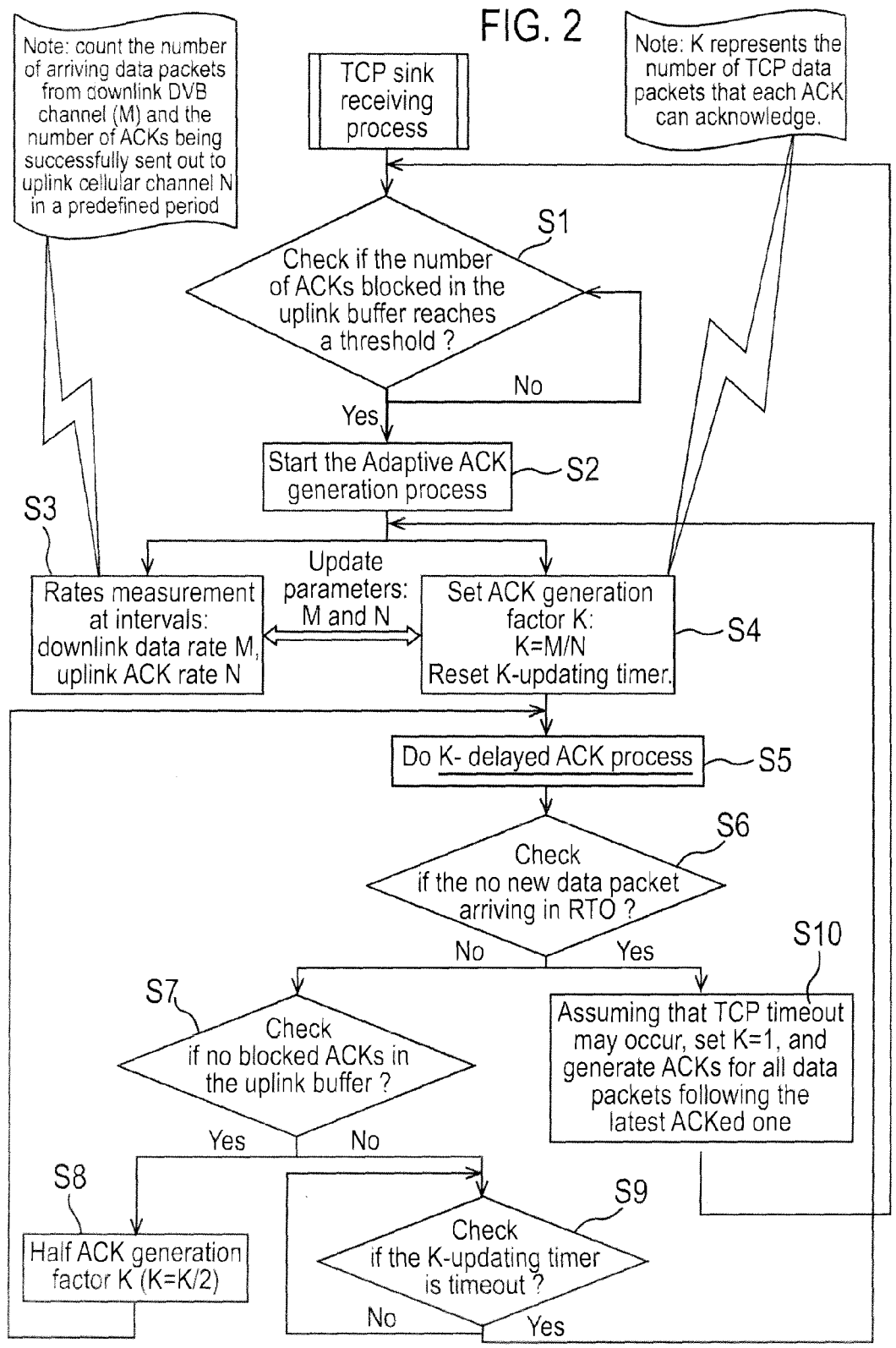
FIG. 2 is a flowchart showing the steps of an algorithm used to adjust the ACK packet generation rate in accordance with an embodiment of the present invention.

FIG. 2 shows the steps of an algorithm used to adjust the ACK packet generation rate in accordance with an embodiment of the present invention.

At S1 of the algorithm the TCP sink monitors an uplink buffer in the device 16 at the wireless interface and determines the number of ACK packets stored in the buffer. When the number of ACK packets exceeds a predefined threshold the algorithm continues to S2.

At S2 the TCP sink enables the ACK generation algorithm.

At S3 the TCP sink measures the number of ACK packets N sent on the uplink channel and the number of TCP data packets M arriving on the DVB-H downlink channel in a predetermined time period T.

Based on the measurement M and N, the optimal value of the ACK generation rate K is then obtained by:

$$K=M/N \quad (1)$$

At S4 the ACK generation rate K is set according to equation 1.

At S5 the TCP sink then employs a K-delayed ACK process to generate one ACK packet for every K continuously received data packets. The K-delayed ACK generation process of S5 is shown in FIG. 3.

Figure 3:
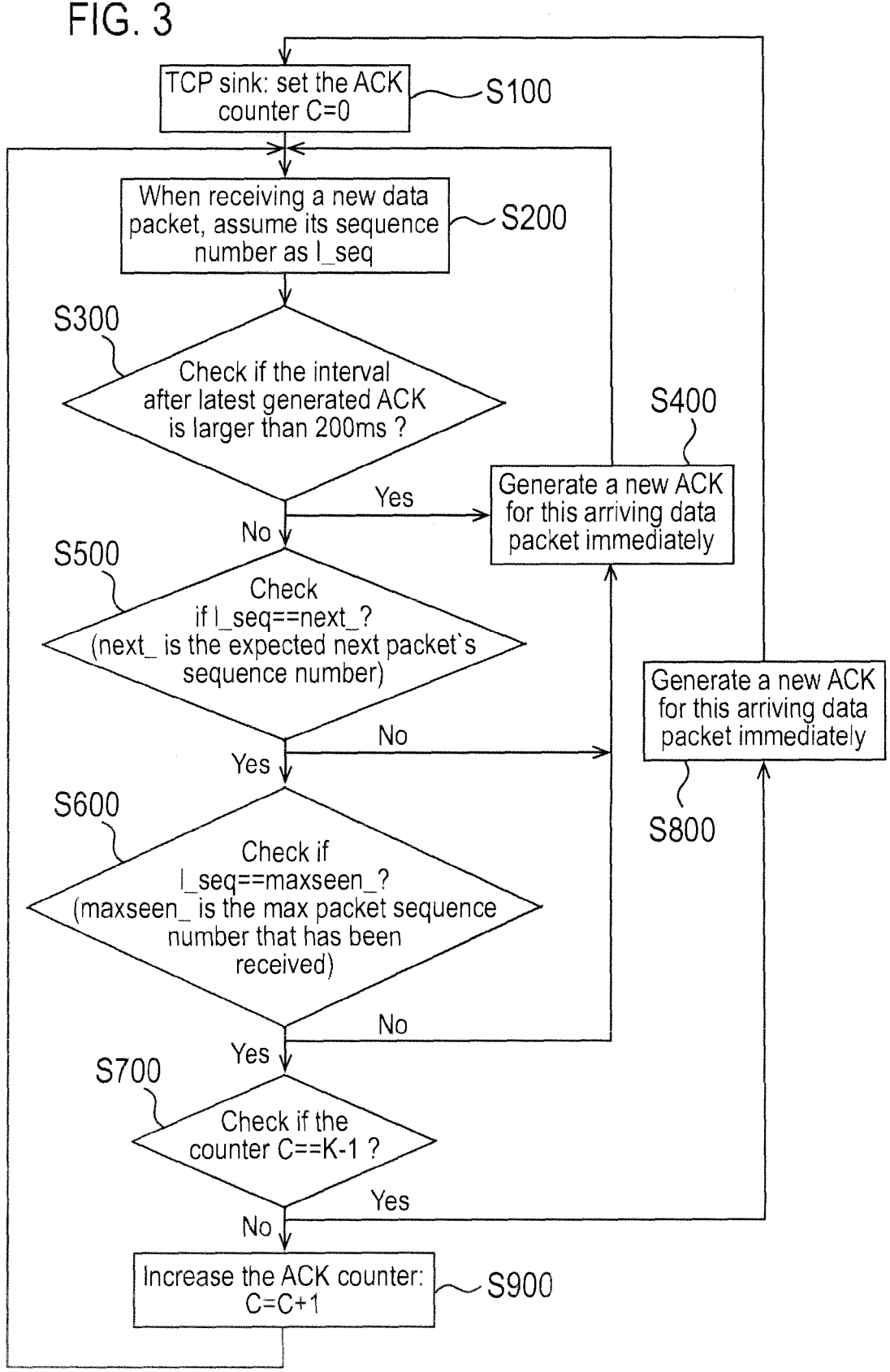
FIG. 3 is a flowchart showing the adaptive ACK generation process according to an embodiment of the invention.

Referring to FIG. 3, at 100 the TCP sink sets the ACK packet counter to C=0.

At 200 the TCP sink receives a new data packet and determines the sequence number of the data packet, herein referred to as l_seq. The sequence number is included in the header of the data packet.

As discussed previously, the data server 10 will only continue to send data packets if it receives ACK packets from the device 16. It has been found that the maximum delay between the transmissions of subsequent ACK packets should not exceed 500 ms in order to achieve good TCP granularity. In accordance with an embodiment of the invention the maximum delay guarantee is set at 200 ms. Accordingly, at 300 the TCP sink determines if the interval after the most recently generated ACK packet exceeds 200 ms.

If the interval after the most recently generated ACK packet does exceed 200 ms, the process continues to S400.

At S400 the TCP sink immediately generates an ACK packet for the arriving data packet with the sequence number l_seq. The process then returns to 200.

If the interval after the most recently generated ACK packet does not exceed 200 ms, the process continues to S500.

At S500 the TCP sink determines if the received data packet with the sequence number l_seq is the next packet in the sequence.

If it is detected that the received packet was not the next expected packet in the sequence after a previously received packet, this indicates that there is a gap in the current data sequence and the process continues to S400 where the TCP sink immediately generates an ACK packet for the arriving data packet with the sequence number l_seq. The process then returns to S200.

If it is detected that the received packet was the next expected packet in the sequence, the process continues to S600.

At S600 the TCP sink detects if the received packet has the largest packet sequence number received thus far. If so this indicates that the packet is the latest in the sequence and the process continues to S700. If not this indicates that an earlier packet has arrived late and that there is a gap in the sequence and the process continues to S400 where a new ACK is generated immediately.

At 700 the TCP sink checks the counter and determines if the counter is at a value K−1. If the counter is at a value K−1, this indicates that the data packet received is the Kth data packet received since the last ACK packet was sent and the process continues to S800.

At S800 the TCP sink immediately generates an ACK packet for the arriving data packet with the sequence number l_seq. The process then returns to S100 where the counter is reset to C=0.

If the counter is not yet at a value K−1, this indicates that the data packet received is not the Kth data packet received since the last ACK packet was sent and the process continues to S900.

At 900 the TCP sink is arranged to increase the counter by one. The process then continues to 200.

Returning to FIG. 2, at S6 the TCP sink checks the receiving status to predict if a timeout may occur. This may be achieved by timing the gaps between the receipt of data packets. According to an embodiment of the invention the TCP sink estimates the RTT (Round Trip Time) of the TCP connection in order to determine a RTO (Retransmission Time Out) value prediction. For example, the RTT estimation can be done just by simply letting the TCP sink send an echo ICMP (Internet Control Message Protocol) packet to the sender and measure the time interval before receiving the echo response from the TCP server. Based on measured RTT, the RTO value can be calculated according to a TCP standard specification. Various ways of predicting the RTO value are known in the art and will therefore not be described herein. The inventors of the present invention have found that the precision of RTO prediction does not have any key influence on the algorithm performance.

If at S6 it is detected that new data packets have been received during the RTO period the algorithm continues to S7.

At S7 the TCP sink checks if there are any blocked ACK packets in the uplink buffer. If there are no ACK packets blocked in the uplink buffer for a predefined period, this indicates that the ACK packet generation frequency is too low. The algorithm then continues to S8.

At S8 the ACK generation rate K is halved. The process then continues to S5.

If there are some ACK packets in the uplink buffer the value of K does not need to be updated until a predetermined time when the value of K is reset by re-evaluating the uplink and downlink data rates. Thus if it is determined that there are ACK packets in the buffer, the algorithm continues to S9 where the TCP sink maintains a K-updating timer. When the predetermined time for updating the value of K expires the algorithm continues to S3 to update the value of downlink and uplink throughput ratio dynamically for optimal performance.

If at S6 it is determined that no data packets have been received during the RTO period the algorithm continues to S10.

At S10 the TCP sink sets K to a value of one thus generating an ACK packet to acknowledge the last data packet received since the last ACK packet was sent, and thereby cumulatively acknowledging all of the remaining previously unacknowledged data packets.

The adaptive ACK generation process will be disabled until the TCP congestion window is recovered. Accordingly, after S10 the algorithm continues to S1 whereby the adaptive ACK generation process is only restarted if the number of ACK packets in the uplink buffer reaches the threshold described previously.

According to an alternative embodiment of the present invention the value of K may be set using equation (1) as described in S3 and then updated regularly by repeating the measurements of M and N at predetermined time intervals.

The required data processing functions may be provided via one or more data processor entities. All required processing may be provided in the TCP module 26 of FIG. 1. An appropriately adapted computer program code product, embodied in a computer-readable medium, may be used for implementing the embodiments, when loaded to a processor, for example for computations required when determining the value of K. The program code product for providing the operation may be stored on and provided via a carrier medium such as a carrier disc, card or tape. A possibility is to download the program code product via a data network. Implementation may be provided with appropriate software in a server.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The Applicant draws attention to the fact that the present invention may include any feature or combination of features disclosed herein either implicitly or explicitly or any generalisation thereof, without limitation to the scope of any of the present claims. The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method of transmitting data in a communication system, comprising:
    transmitting data packets from a first node to a second node on a first channel; and
    transmitting an acknowledgement packet from the second node to the first node on a second channel in response to receiving a number of packets on the first channel,
    wherein the number of data packets that the acknowledgment packet is sent in response to is adjustable.

2. A method as claimed in claim 1, further comprising dynamically adjusting the number of packets that the acknowledgment packet is sent in response to.

3. A method as claimed in claim 1, wherein the number of packets that the acknowledgment packet is sent in response to may be adjusted in dependence on a ratio of the number of packets transmitted on the first channel to the number of packets transmitted on the second channel.

4. A method as claimed in claim 1, wherein the number of data packets that the acknowledgment packet is sent in response to is defined by a generation rate.

5. A method as claimed in claim 4, wherein the generation rate is determined according to an algorithm.

6. A method as claimed in claim 5, wherein the algorithm is started after a predetermined number of acknowledgment packets are stored in an uplink buffer.

7. A method as claimed in claim 4, wherein the generation rate is determined from a ratio of the number of packets transmitted on the first channel to the number of packets transmitted on the second channel.

8. A method as claimed in claim 4, wherein the generation rate is updated after a predetermined time.

9. A method as claimed in claim 1, wherein, on receipt of a data packet on the first channel, an acknowledgement packet is generated immediately if the time since the last acknowledgement packet was sent exceeds a predetermined time.

10. A method as claimed in claim 8, wherein the predetermined time is 200 ms.

11. A method as claimed in claim 1, wherein, on receipt of a data packet on the first channel, an acknowledgement packet is generated immediately if the data packet is not the next in sequence to a previously received data packet.

12. A computer program product, comprising program code in a Non-transitory computer readable medium, the program code configured to perform the of processes of claim 1 when the program code is run on a computer.

13. A communication system, comprising:
   a first node configured to transmit data packets; and
   a second node configured to:
      receive the transmitted data packets from the first node, and
      transmit an acknowledgement packet from the second node to the first node on a second channel in response to receiving a number of packets on the first channel, wherein the number of data packets that the acknowledgment packet is sent in response to is adjustable.

14. A communication system as claimed in claim 13, wherein the second node is further configured to dynamically adjust the number of packets that the acknowledgment packet is sent in response to.

15. A communication system as claimed in claim 14 wherein the adjusting of the number of packets that the acknowledgment packet is sent in response to is dependent on the ratio of the number of packets transmitted on the first channel to the number of packets transmitted on the second channel.

16. A communication system as claimed in claim 13 further comprising means for updating the number of data packets that the acknowledgment packet is sent in response to after a predetermined time.

17. A device for transmitting data in a communication system, comprising:
   a processor; and
   a carrier medium communicatively connected to the processor and including:
      computer code for processing received data packets from a network node on a first channel; and
      computer code for transmitting an acknowledgement packet to the first network node on a second channel in response to receiving a number of packets on the first channel wherein the number of data packets that the acknowledgment packet is sent in response to is adjustable.

18. A device as claimed in claim 17 wherein the carrier medium further includes computer code for generating the acknowledgement packet.

19. A device as claimed in claim 18 wherein the a TCP sink is used to generate the acknowledgement packet.

20. A device as claimed in claim 17 wherein the carrier medium further includes computer code for dynamically adjusting the number of packets that the acknowledgment packet is sent in response to.

21. A device as claimed in claim 20 wherein the computer code for dynamically adjusting the number of packets is arranged to adjust the number of packets that the acknowledgment packet is sent in response to is dependent on the ratio of the number of packets transmitted on the first channel to the number of packets transmitted on the second channel.

22. A device as claimed in claim 17 wherein the device further comprises an uplink buffer.

23. A device as claimed in claim 17 wherein the carrier medium further includes computer code for executing an algorithm to adjust the number of packets that the acknowledgment packet is sent in response to.

24. A device as claimed in claim 17 wherein the carrier medium further includes computer code for determining the ratio of the number of packets transmitted on the first channel to the number of packets transmitted on the second channel.

25. A device as claimed in claim 17 wherein the device is a mobile phone.

26. A device as claimed in claim 17 wherein the network node is a server.

27. A device for transmitting data in a communication system comprising:
   a receiver arranged to receive data packets from a network node on a first channel; and
   a transmitter arranged to transmit an acknowledgement packet from to the first network node on a second channel in response to receiving a number of packets on the first channel wherein the number of data packets that the acknowledgment packet is sent in response to is adjustable.

* * * * *